March 17, 1925.
G. W. SMITH
VEHICLE DRIVE
Filed July 7, 1923
1,529,932
4 Sheets—Sheet 1
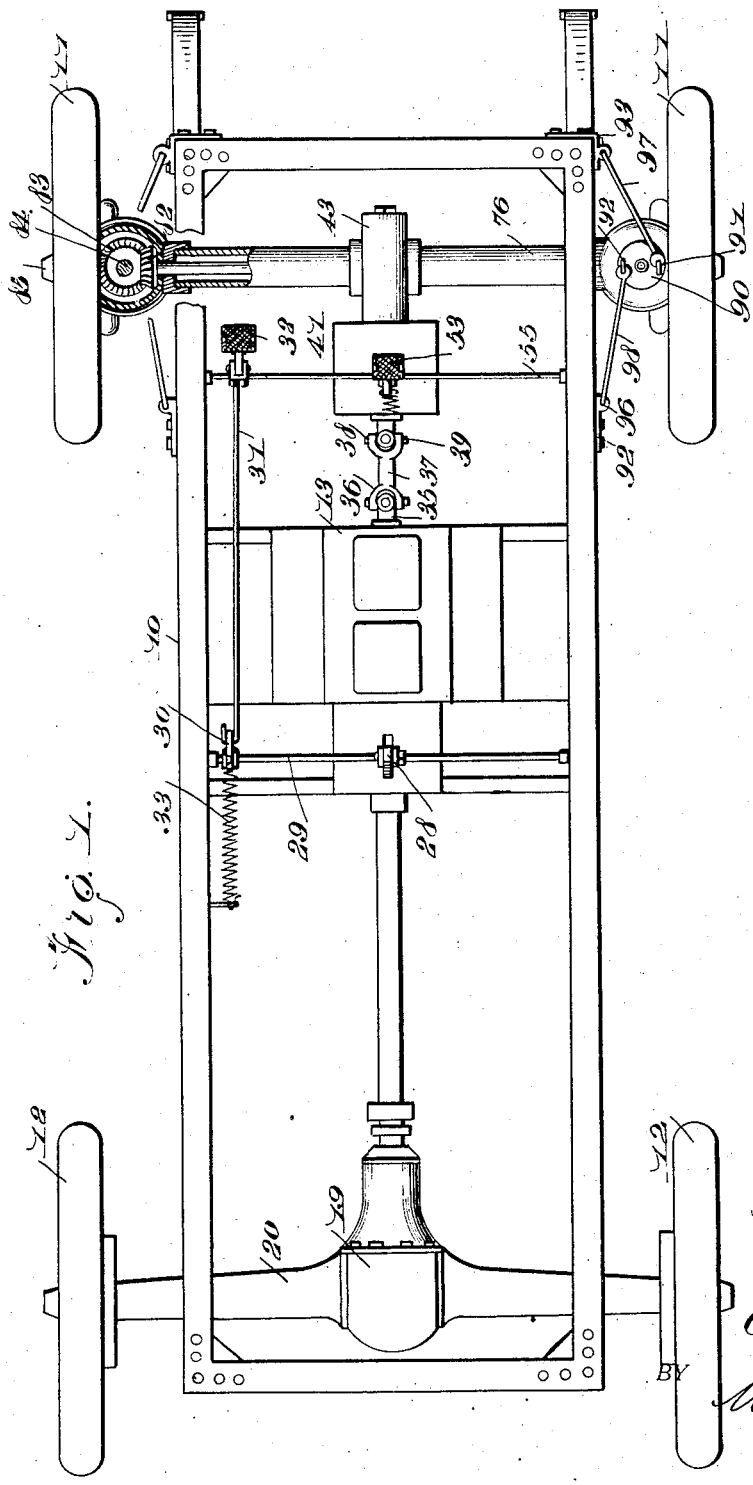
INVENTOR
G. W. Smith
BY
Munn & Co.
ATTORNEYS March 17, 1925.  
G. W. SMITH  
VEHICLE DRIVE  
Filed July 7, 1923  
1,529,932  
4 Sheets-Sheet 2
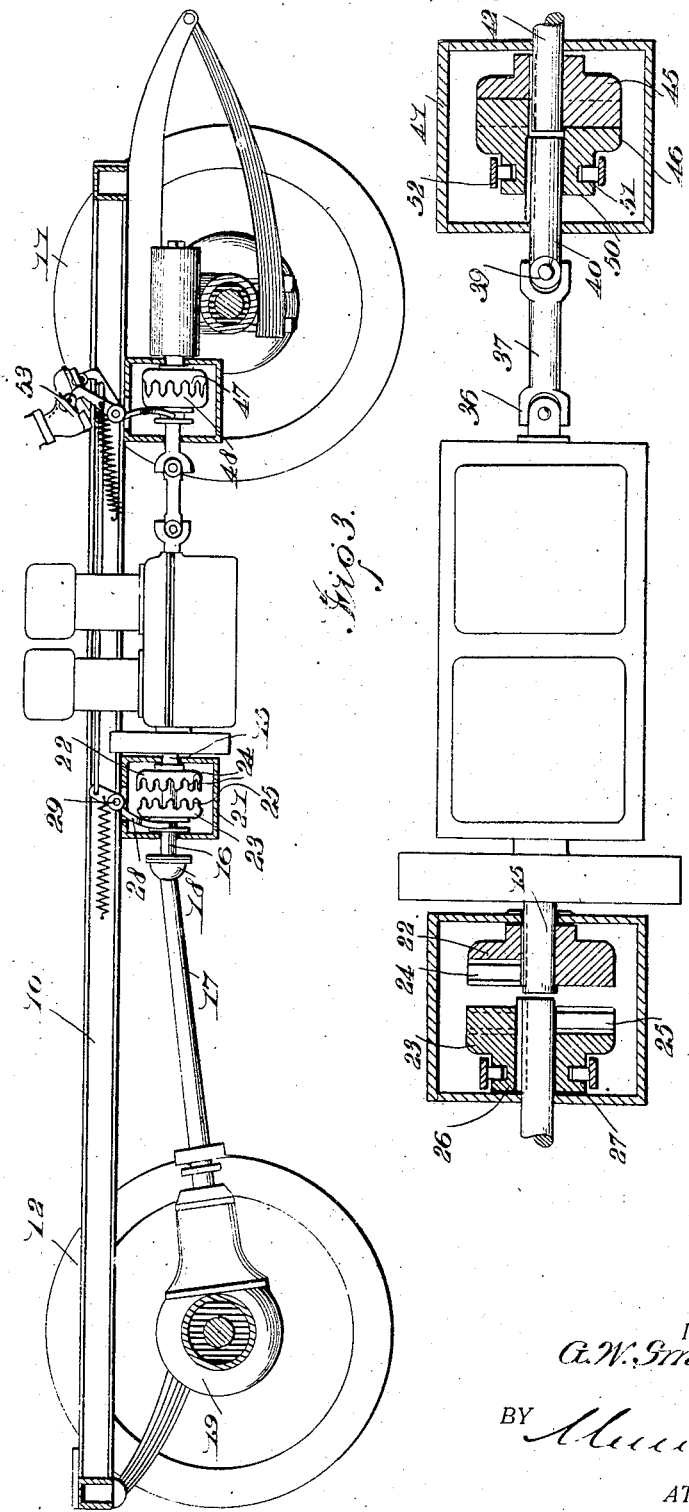
INVENTOR  
G. W. Smith

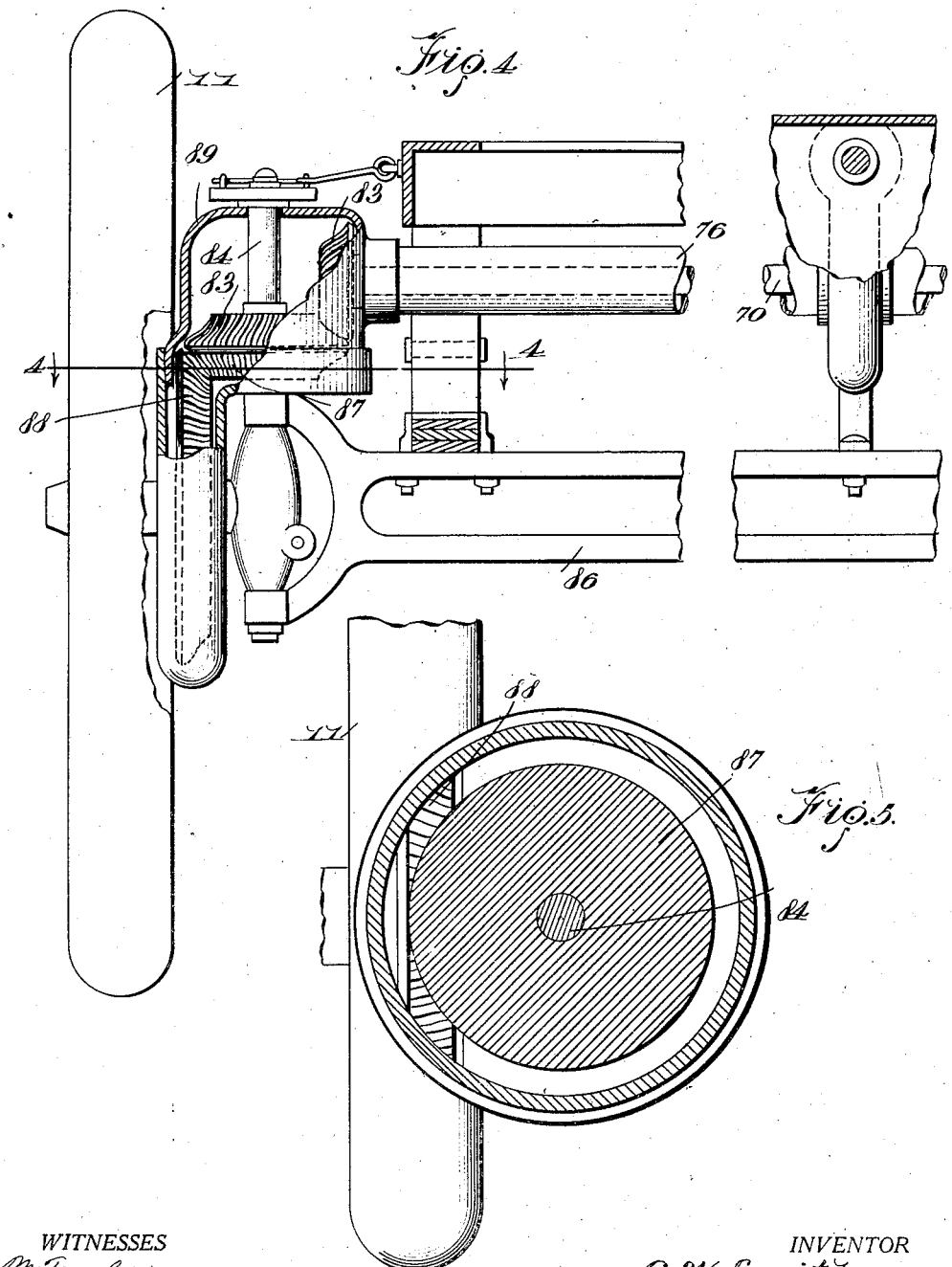

March 17, 1925.  
G. W. SMITH  
VEHICLE DRIVE  
Filed July 7, 1923    4 Sheets-Sheet 4
1,529,932
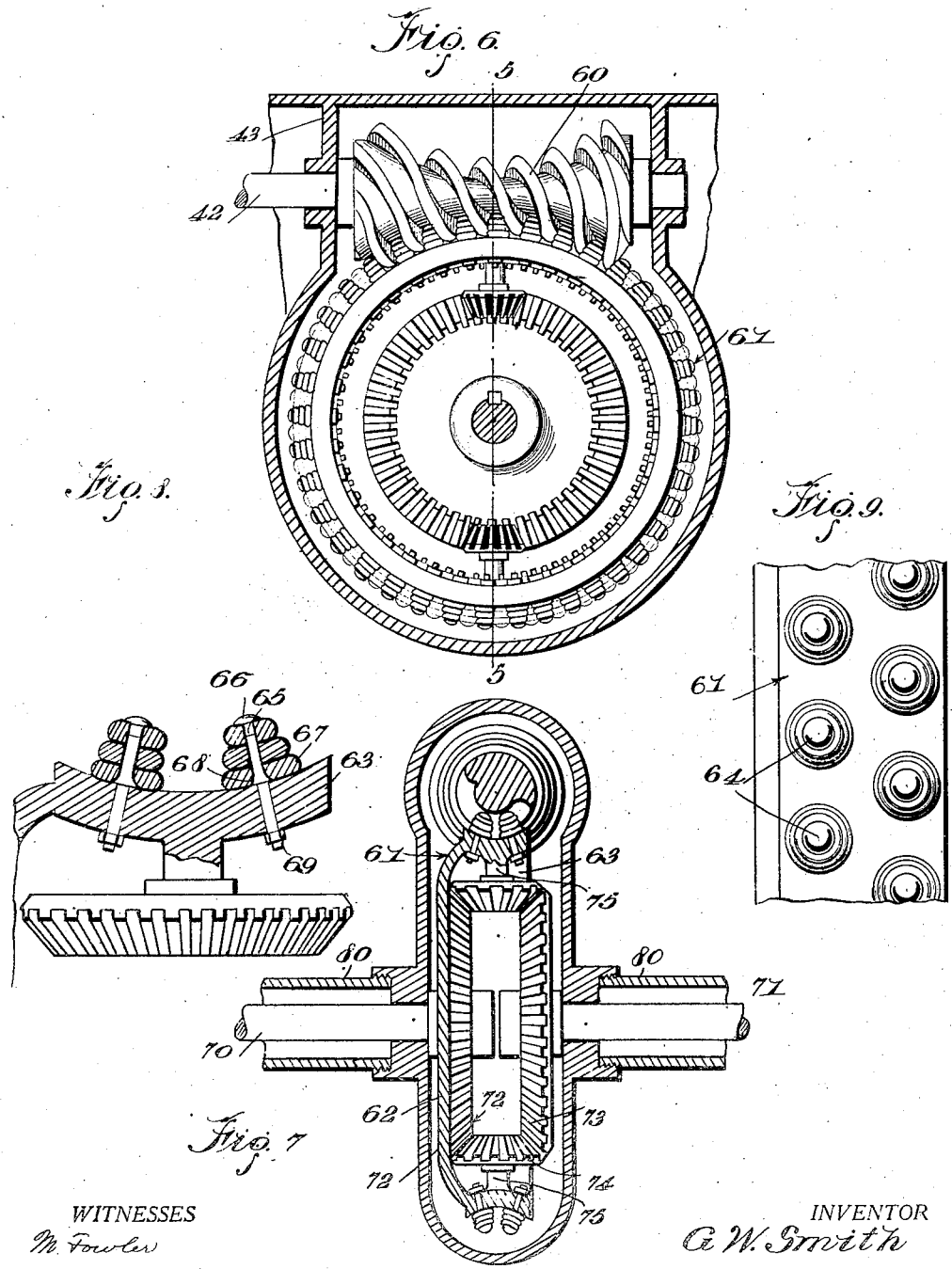
INVENTOR  
G. W. Smith  
BY  
ATTORNEYS Patented Mar. 17, 1925.

1,529,932

UNITED STATES PATENT OFFICE.

GEORGE W. SMITH, OF DALLAS, TEXAS.

VEHICLE DRIVE.

Application filed July 7, 1923. Serial No. 650,056.

*To all whom it may concern:*

Be it known that I, GEORGE W. SMITH, a citizen of the United States, and a resident of Dallas, in the county of Dallas and State of Texas, have invented certain new and useful Improvements in Vehicle Drives, of which the following is a specification.

This invention relates to an improvement in vehicle drives, and the object of the invention is to provide a vehicle drive whereby the front wheels of the vehicle or the the rear wheels thereof may be selectively driven or may be simultaneously driven at will, the drive being at the same time so constructed and organized as to be susceptible of ready and convenient control and as to effectively and efficiently transmit the power from the engine to the wheels.

Other objects and advantages of the invention reside in certain novel features of the construction, combination and arrangement of parts which will be hereinafter more fully described and particularly pointed out in the appended claim, reference being had to the accompanying drawings forming part of this specification, and in which:

Figure 1 is a plan view illustrating the preferred embodiment of the invention;

Figure 2 is a view thereof in side elevation, parts being broken away and shown in section for the sake of illustration;

Figure 3 is a fragmentary view, partly in elevation and partly in section, showing the mechanism employed for controlling the operation of the drive;

Figure 4 is a fragmentary view, partly in section and partly in elevation, showing the front wheel drive and steering arrangement;

Figure 5 is a view in section, on line 4—4 of Figure 3;

Figure 6 is a detail view, partly in section and partly in elevation illustrating the construction of the differential preferably employed;

Figure 7 is a view in section, taken on line 7—7 of Figure 6;

Figure 8 is an enlarged detail view in section, showing a fragment of the master gear of the differential;

Figure 9 is a similar view of the master gear in plan;

Figure 10 is a similar view in side elevation; and

Figure 11 is a detail view of one of the studs of the master gear.

Referring to the drawings wherein for the sake of illustration is shown the preferred embodiment of the invention the numeral 10 designates the frame or chassis of a vehicle, the running gear of which includes front wheels 11 by which the vehicle is steered and rear wheels 12. The power plant or engine is designated at 13 and is supported in any appropriate manner on the chassis 10. The rear wheels 12 are driven from the rear end of the engine and for this purpose a shaft 15 projects from the engine at its rear end and extends up close to a section 16 of the drive shaft 17, the drive shaft embodying a universal joint 18 and being connected with a differential 19 embodied in the rear axle assembly 20 from which the rear wheels 12 are driven. The section 16 of the drive shaft is preferably suitably journaled in bearings provided therefor in a boxing or casing 21, the boxing or casing 21 being suitably supported on the frame of the vehicle and enclosing the shaft 15 as well as the greater part of the section 16 of the drive shaft. A disk 22 is suitably fixed or secured to the shaft 15 within the boxing 21 so as to be constrained to partake of the rotary movement of the shaft 15 and to be held against longitudinal movement thereon. A coacting disk 23 is splined on that part of the section 16 of the drive shaft located within the boxing 21 so that the disk 23 is constrained to partake of the rotary movement of the drive shaft while free to be shifted longitudinally relative to the section 16. The confronting faces of the disks 22 and 23 are provided with interfitting fingers, designated at 24 and 25 respectively, the outer ends of the fingers being beveled to facilitate interengagement of the same. The disk 23 is provided with a hub or collar 26 having formed therein an annular groove 27 with which a shifting fork 28 coacts. The shifting fork 28 is fixed to a rotatable shaft 59 journaled in the side members of the chassis 10 and having a crank arm 30 connected by a link 31 to a foot pedal 32. If desired a spring 33 may be employed and may be connected to the crank arm 30 and to one of the side members of the chassis so as to tend to rotate the shaft 21 in such a manner as to bring the fingers of the disk 22 and 23 into engagement. Obviously however this spring 33 may be omitted or may be arranged to have an opposite tendency. It is also to be understood that in lieu of a foot lever a hand lever may be employed.

The engine shaft also projects at its forward end from the engine 13, as indicated at 35, and is connected by a universal joint 36 to a section 37 of the front drive shaft designated generally at 38. This drive shaft 38 may also embody a second universal joint 39 between the section 37 and a driving section 40 which is extended within a casing or boxing 41 and alined with and disposed in close proximity to a driven section 42. The boxing 41 is preferably supported upon the differential casing 43 and and the shaft 42 is also journaled in suitable bearings provided therefor in this casing 43. Within the boxing 41 a fixed disk 45 is rigidly secured to the driven section 42 of the shaft 38 and a sliding disk 46 is splined to the driving section 40 of the shaft and coacts with the fixed disk 45. The disks 45 and 46 have interfitting fingers designated at 47 and 48, respectively, and obviously when these interfitting fingers are interengaged, as shown in Figure 2, the motion of the driving section 40 is transmitted to the driven section 42 whereas when these fingers are disengaged the drive section 40 may rotate without transmitting its motion to the driven section 42. The disks 45 and 46 are of identical construction and have precisely the same function as the disks 22 and 23 as hereinabove described. The disk 46 is formed with an integral collar 50 provided with an annular groove 51 in its periphery and a shifting collar 52 coacts with this annular groove 51. The shifting collar 52 is controlled from a spring pressed foot pedal 53 which may be integrally formed with or suitably connected to the shifting fork 52. The foot pedal 53 as well as the foot pedal 32 is mounted on a supporting shaft 55 carried by the frame members of the chassis.

Within the differential casing 43 a worm 60 is fixed to the driven section 42 of the front drive shaft and this worm 60 coacts with the worm wheel designated generally at 61 which constitutes the master gear of the differential. The worm wheel 61 includes a plate like body portion 62 having integrally formed with its outer periphery a rim 63 of concavo convex form. On the rim 63 a plurality of teeth 64 are secured and are disposed to coact with the worm 60. These teeth 64 are of the construction shown in Figures 6, 8 and 9 and each includes a stud 65 having a head 66 at its outer end and rotatably supporting a plurality of rollers 67 of graduated size, the rollers being held in position on the studs and the largest roller mounted on each stud engaging a removable shoulder or abutment 68 threaded on the shank of the stud intermediate its ends. The portion of the shank of the stud on the other side of the shoulder 68 from that on which the rollers are mounted extends through an opening provided therefor in the rim 63 and is secured therein by nuts or other fastening means 69. It is to be understood that the rollers of each stud are independently rotatable and this provides for very efficient and effective transmission of the power as various portions of each tooth of the worm wheel may be rotated or moved relative to the other portions of the same tooth. The plate like body portion 62 of the master gear is loosely mounted on a shaft 70, the other shaft associated with the differential being designated at 71. It is to be understood that these shafts 70 and 71 correspond in function with the sections of the axle ordinarily employed with differentials. The shafts 70 and 71 have secured thereto beveled gears, designated at 72 and 73 which coact with pinions 74 rotatably mounted on studs 75 integrally formed therewith or otherwise suitably secured to the master gear. It is obvious that the differential just described is similar in all respects to the differentials ordinarily employed except as to the particular construction of the master gear and its teeth.

The shafts 70 and 71 extend through casings 80 provided therefor and the outer end of each of the shafts 70 and 71 carries a beveled pinion 82. Each beveled pinion 82 meshes with a beveled gear wheel 83 mounted on a spindle 84, this same spindle 84 serving to connect the stub axle 85 of the adjacent front wheel 10 to the stationary or main axle 86 and serving to carry a second beveled gear wheel 87 which may be integrally formed or suitably secured to the beveled gear wheel 83 and which meshes with an annular beveled gear 88 secured to the adjacent front wheel 11. A casing 89 encloses the gears 82, 83, 87 and 88 to house and protect the same. The upper end of each spindle 34 has secured thereto a disk 90 having diametrically opposite eyes 91 and 92. Brackets 93 and 94 are provided at each side of the frame and each include an apertured lug, designated at 95 and 96 respectivly. A rod, designated at 97 extends between the bracket 93 and the eye 91 and a similar rod 98 extends between the bracket 94 and the eye 92, the said rods having eyes formed at their ends which interengage with the eyes 91 and 92 and the apertured lugs of the bracket. The rods thus constituted reinforce and brace the axle assembly and the drive carried thereby and yet permit the necessary movements of these parts.

In operation the vehicle may be driven from the front wheels or from the rear wheels or from both front and rear wheels as may be found desirable by manipulating the foot pedals 33 and 53 or other control means provided for shifting the sliding disks 23 and 48. Of course it is to be understood that when the coacting disks 23 and 24 have their interfitting fingers engaged the rear wheels are driven and when the interfitting fingers are disengaged the rear wheels are not driven and the same is true of the disks 45 and 46 which serve to transmit the drive to the front wheels. The disks 23 and 24 and similarily the disks 45 and 46 together with their interfitting fingers serve as a very effective means for transmitting power from the engine to the wheels, and the transmission of power is further enhanced by the construction of the master gear wheel of the differential and especially by the construction of the teeth thereof.

I claim:

A vehicle including a frame, drive wheels, an engine, means for driving the wheels from the engine including a shaft, a differential and vertical spindles driven from the differential and operatively connected with the drive wheels, each of said vertical spindles including a disk at its upper end and rods pivotally connected to the disk at diametrically opposite points and to the frame.

GEORGE W. SMITH.